UNITED STATES PATENT OFFICE.

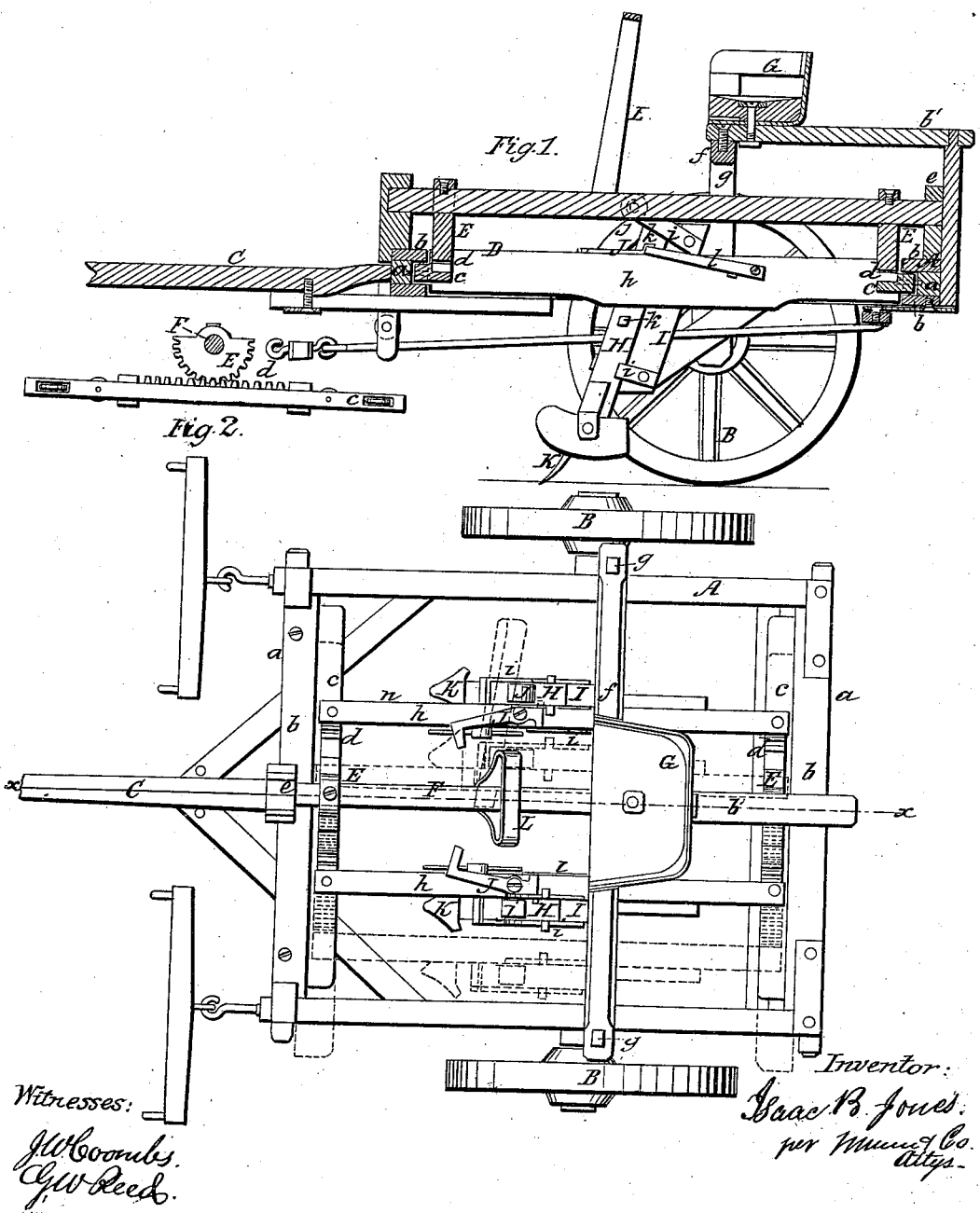

ISAAC B. JONES, OF XENIA, OHIO.

IMPROVEMENT IN CULTIVATORS.

Specification forming part of Letters Patent No. 36,158, dated August 12, 1862.

*To all whom it may concern:*

Be it known that I, ISAAC B. JONES, of Xenia, in the county of Greene and State of Ohio, have invented a new and Improved Cultivator-Plow; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a plan or top view of the same.

Similar letters of reference indicate corresponding parts in the two figures.

The object of this invention is to obtain a plow for the cultivation of crops which are grown in hills or drills, and one which will have its plows under the complete control of the operator, so that the latter may move or shift the plows laterally to conform to the sinuosities of uneven rows, and thereby insure the plants being plowed in a perfect manner and without danger of being plowed out of the hills or drills.

To this end the invention consists in the employment or use of a laterally-sliding plow-frame placed within a mounted frame and operated by a rock-shaft, toothed segments, and racks, all arranged as hereinafter fully shown and described to effect the desired result.

To enable those skilled in the art to fully understand and construct my invention, I will proceed to describe it.

A represents a rectangular frame, which is mounted on two wheels, B B, and has a draft-pole, C, attached to it. The front and back bars, $a\ a$, of the frame A are grooved longitudinally at their inner sides, or have top and bottom strips, $b$, attached to them, in order to form grooves to receive the end bars, $c$, of a rectangular frame, D, the bars $c$ being allowed to work freely in the grooves of the bars $a\ a$. Each bar $c$ has a rack, $d$, secured to its upper surface, and into these racks toothed segments E E gear, one in each, said segments being on a rock-shaft, F, the journals of which have their bearings in uprights $e\ e$, attached to the front and back bars, $a\ a$, of the frame A.

G is the driver's seat, which is attached to a bar, $b'$, the back end of which rests on the upright $e$ on the back bar of the frame A, the front end of the bar $b'$ resting on a bar, $f$, the ends of which are secured to supports $g\ g$, one at each side of the frame A.

The two parallel side bars, $h\ h$, of the frame D have each a plow-standard, H, attached to them. These plow-standards are not connected directly to the side bars, $h$, but they are fitted in guides $i$, which are secured to inclined pendants I, the latter being permanetly attached to the outer surfaces of the side bars, $h\ h$, of the frame D.

The upper guides, $i$, may be provided with friction-rollers $j$, to admit of the standards H being readily raised and lowered, and the standards are retained at any desired height by means of catches J, which are attached to the upper surfaces of the side bars, $h\ h$, and are retained in any of a series of holes, $k$, in the inner surfaces of the standards H by springs $l$.

To the lower ends of the standards H H there are attached plows K K, one to each. These plows may be of any proper form, and to the rock-shaft F there is secured a lever, L, which extends upward directly in front of the driver's seat G.

The operation is as follows: As the machine is drawn along the plows K K enter the ground and operate in the usual way, and the driver, by actuating the lever L and turning the rock-shaft F, may move the plows either to the right or left, as may be required, thereby keeping the plows at a proper distance from the plants, however crooked the rows or hills may be.

By adjusting the standards H higher or lower the plows K may be made to penetrate into the earth to a greater or less depth, as may be desired.

I am aware that laterally-moving adjustable plows have been previously used, and I do not claim broadly such device irrespective of the arrangement of parts for effecting the result, as herein described; but I do claim as new and desire to secure by Letters Patent—

1. The laterally moving or adjustable plow-frame D, when operated as shown—to wit, by means of the toothed segments E E on the rock-shaft F gearing into the racks $d\ d$ on the frame D, and the latter fitted in the mounted frame A, as and for the purpose set forth.

2. The manner of attaching the plow-standards H to the frame D—to wit, by placing the standards in guides $i$, attached to pendants I, secured to the frame D, and securing the standards at any desired height by means of the catches J, as and for the purpose specified.

ISAAC B. JONES.

Witnesses:
 GEORGE W. WRIGHT,
 SAM. J. OAKLEY.